United States Patent
Watanabe et al.

(10) Patent No.: US 7,253,955 B2
(45) Date of Patent: Aug. 7, 2007

(54) CONTRAST IMPROVING SHEET AND REAR PROJECTION SCREEN PROVIDED WITH THE SAME

(75) Inventors: Hitomu Watanabe, Shinjuku-Ku (JP); Makoto Honda, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 301 days.

(21) Appl. No.: 10/524,537

(22) PCT Filed: Apr. 26, 2004

(86) PCT No.: PCT/JP2004/005975

§ 371 (c)(1),
(2), (4) Date: Feb. 14, 2005

(87) PCT Pub. No.: WO2005/103769

PCT Pub. Date: Nov. 3, 2005

(65) Prior Publication Data

US 2006/0139749 A1    Jun. 29, 2006

(30) Foreign Application Priority Data

Oct. 31, 2002   (JP)   .............................. 2002-318931

(51) Int. Cl.
    *G03B 21/60*  (2006.01)
    *G03B 21/56*  (2006.01)
(52) U.S. Cl. .................... 359/459; 359/456; 359/457; 359/460
(58) Field of Classification Search ................ 359/459, 359/443, 454–457, 460, 452–453
    See application file for complete search history.

(56) References Cited

U.S. PATENT DOCUMENTS

| 5,768,014 A * | 6/1998 | Lee ............................. 359/457 |
| 6,417,966 B1 * | 7/2002 | Moshrefzadeh et al. .... 359/453 |
| 6,961,176 B2 * | 11/2005 | Sekiguchi .................... 359/457 |
| 6,987,624 B2 * | 1/2006 | Watanabe et al. ............ 359/742 |
| 6,995,907 B2 * | 2/2006 | Osawa et al. ................ 359/460 |
| 7,072,109 B2 * | 7/2006 | Goto et al. .................. 359/460 |

FOREIGN PATENT DOCUMENTS

| JP | 2002-352611 | 12/2002 |
| JP | 2003-66206 | 3/2003 |
| JP | 2003-177394 | 6/2003 |
| JP | 2004-086187 | 3/2004 |

* cited by examiner

*Primary Examiner*—W B Perkey
*Assistant Examiner*—Magda Cruz
(74) *Attorney, Agent, or Firm*—Oliff & Berridge, PLC

(57) ABSTRACT

A contrast improving sheet includes a first optical functional element and a second optical functional element on the viewing side thereof. The first optical functional element has a plurality of protrusions, each having a pair of opposite total-reflection facets for totally reflecting image light rays substantially perpendicularly incident on the entrance surface and a flat facet extending between the front edges, on the side of the exit surface, of the pair of opposite total-reflection facets. Light absorbing layers are formed between the adjacent protrusions. The second optical functional element has a light path correcting layer for correcting light paths followed by the image light rays totally reflected by the total-reflection facets such that the image light rays are emitted through the exit surface substantially perpendicularly to the exit surface. The light path correcting layer has a plurality of alternately inclined planes inclined in opposite directions.

11 Claims, 10 Drawing Sheets

CONTRAST IMPROVING SHEET AND REAR PROJECTION SCREEN PROVIDED WITH THE SAME

TECHNICAL FIELD

The present invention relates to a contrast improving sheet to be disposed on the viewing side of a display, such as a rear projection display, a liquid crystal display, a plasma display or a CRT, and to a rear-projection screen provided with the same contrast improving sheet. The term "contrast improving sheet" is used in this specification to signify an optical sheet for suppressing decrease in contrast in images displayed by a display due to external light and stray light to improve contrast in images displayed by the display.

BACKGROUND ART

There have been proposed various techniques for optimizing viewing angle of a display, such as a rear projection display or a liquid crystal display, and improving contrast in images displayed by the display so that the viewers are able to recognize images clearly.

More concretely, a previously proposed first optical element is provided with lenticular lenses, namely, light diffusing elements, on its back surface (a surface facing an image light source) on which image light falls, and with light absorbing elements on light intercepting parts, which do not transmit image light, in its front surface on the viewing side to absorb external light incident on the front surface.

A second optical element proposed in JP 50-121753 U and JP 60159733 A is provided on its front surface on the viewing side, as light diffusing elements, with many ribs each having inclined reflecting facets and an exit facet formed between the inclined reflecting facets, and a light absorbing material filling up V-grooves between the adjacent inclined facets to absorb external light incident on the front surface from the viewing side.

Although the first optical element is effective to some extent in improving contrast, the first optical element cannot be used as a directional optical element because parallel light rays perpendicularly incident on the first optical element are diffused by the lenticular lens elements. In the first optical element, the lenticular lens elements on the back surface and the light absorbing parts on the front surface need to correspond to each other in one-to-one correspondence. Therefore, it is very difficult to manufacture the first optical element when the lenticular lenses are arranged at short pitches.

The second optical element divides incident light rays into outgoing light rays that are emitted through the front surface respectively in three directions, namely, light rays not reflected by the inclined facets of the ribs and emitted through the exit facets in a direction normal to the exit facets, light rays totally reflected by the opposite inclined facets of each rib and emitted through the exit facet in two directions at specific angles to the exit facet. Therefore, the ribs through which light rays travel must contain a large amount of light diffusing particles to display uniform images. The large amount of light diffusing particles spoils the clearness of images and hence the second optical element cannot be used as a directional optical element.

DISCLOSURE OF THE INVENTION

The present invention has been made in view of those problems and it is therefore an object of the present invention to provide a contrast improving sheet to be disposed in front of the front surface, on the viewing side, of a display, such as a rear projection display or a liquid crystal display, capable of increasing contrast and having excellent directivity, and to provide a rear projection screen provided with the same contrast improving sheet.

A contrast improving sheet in a first aspect of the present invention to be disposed in front of the front surface, on the viewing side, of a display, such as a rear projection display, a liquid crystal display or a plasma display, having an entrance surface and an exit surface, includes an optical element adapted to emit image light rays perpendicularly or substantially perpendicularly (hereinafter, referred to simply as "substantially perpendicularly") incident on the entrance surface in directions perpendicular or substantially perpendicular (hereinafter, referred to simply as "substantially perpendicular") to the exit surface regardless of incidence position on the entrance surface and to absorb stray light rays obliquely incident on the entrance surface and external light fallen on the exit surface.

As shown in FIG. 15, the contrast improving sheet in the first aspect of the present invention (1) emits image light rays 4 substantially perpendicularly incident on the entrance surface of the contrast improving sheet 11 through the exit surface in directions substantially perpendicular to the exit surface (parallel to the incident light rays), (2) absorbs external light 41 fallen on the exit surface perpendicularly and obliquely or makes the external light 41 transmit through the entrance surface so that the external light 41 may not return toward the viewing side, and (3) absorbs stray light rays 42 fallen on the entrance surface at incidence angles not smaller than about 30° and prevents the stray light rays 42 from traveling toward the viewing side. The contrast improving sheet having those three functions stated in (1) to (3) is capable of transmitting the image light fallen on the entrance surface without causing loss at high directivity toward the viewing side and of absorbing stray light rays and external light. Differing from the conventional lenticular lens sheet, the contrast improving sheet of the present invention transmits image light rays toward the viewing side with high directivity scarcely diffusing the image light rays. Thus, the contrast improving sheet can be used as a directional, optical element, or an optical element for a focusing system. As shown in FIG. 16, a conventional lenticular lens sheet 43 diffuses image light rays 4 substantially perpendicularly incident on its entrance surface and light rays 42 incident on the entrance surface at incident angles of about 30° or greater and travel in stray light rays through the lenticular lens sheet 43 such that diffused light rays are emitted toward the viewing side.

In the contrast improving sheet in the first aspect of the present invention, it is preferable that the optical element includes: a first optical functional element provided with a plurality of protrusions arranged in a direction or distributed in a plane, each of the protrusions having a pair of opposite total-reflection facets for totally reflecting image light rays substantially perpendicularly incident on the entrance surface thereof and a flat facet extending between the front edges, on the side of the exit surface thereof, of the pair of opposite total-reflection facets, and light absorbing layers formed between the adjacent protrusions; and a second optical functional element attached to a surface, on the viewing side, of the first optical functional element, and provided with a light path correcting layer for correcting the light paths followed by the image light rays totally reflected by the total-reflection facets of the protrusions such that the image light rays are emitted through the exit surface thereof substantially perpendicularly to the exit surface thereof. Preferably, the light path correcting layer of the second optical functional element has a plurality of inclined surfaces formed in an alternate arrangement and capable of sending out the image light rays completely reflected by the total-reflection facets of the first optical functional element in a direction substantially perpendicular to the exit surface.

Thus, the image light rays substantially perpendicularly incident on the entrance surface of the contrast improving sheet in the first aspect of the present invention, totally reflected by the total-reflection facets of the protrusions of the first optical functional element and traveled through the flat facets are refracted at the inclined surfaces included in the light path correcting layer of the second optical functional element and are emitted from the second optical functional element substantially perpendicularly to the exit surface. The image light rays substantially perpendicularly incident on the entrance surface and traveled through the flat facets without being totally reflected by the total-reflection facets of the protrusions of the first optical functional element are totally reflected by the inclined surfaces included in the light path correcting layer of the second optical functional element and are refracted at the inclined surfaces opposed to the former inclined surfaces included in the light path correcting layer of the second optical functional element and are emitted from the second optical functional element substantially perpendicularly to the exit surface. Thus, the light absorbing layers of the first optical functional element absorb stray light rays and external light; in addition, the light path correcting layer of the second optical functional element corrects the light paths followed by the image light rays totally reflected by the total-reflection facets of the protrusions of the first optical functional element such that the image light rays are emitted substantially perpendicular to the exit surface toward the viewing side; and the image light rays traveled through the flat facets of the protrusions of the first optical functional element without being totally reflected by the total-reflection facets of the protrusions are emitted substantially perpendicularly to the exit surface. Consequently, the contrast improving sheet achieves contrast improvement and high directivity without causing problems that will spoil the clearness of images.

In the contrast improving sheet in the first aspect of the present invention, it is preferable that the inclined surfaces included in the light path correcting layer of the second optical functional element are formed such that substantially parallel are both image light rays substantially perpendicularly incident on the entrance surface thereof, traveled through the flat facets without being reflected by the total-reflection facets of the protrusions of the first optical functional element, reflected by the inclined surfaces and refracted at the inclined surfaces opposed to the former inclined surfaces, and image light rays totally reflected by the total-reflection facets of the protrusions of the first optical functional element, traveled through the flat facets and refracted at the inclined surfaces.

In the contrast improving sheet in the first aspect of the present invention, it is preferable that the light absorbing layers of the first optical functional element are formed of a transparent material having a refractive index smaller than that of a material forming the protrusions of the first optical functional element, the light absorbing layers containing light absorbing particles. In the contrast improving sheet in the first aspect of the present invention, it is preferable that the light absorbing layers of the first optical functional element are formed of a colored material having a refractive index smaller than that of the material forming the protrusions of the first optical functional element.

The light absorbing layers effectively absorb not only external light that falls on the exit surface, but also the stray light rays incident on the entrance surface at incidence angles not smaller than about 30° without totally reflecting the stray light rays by the total-reflection facets of the first optical functional element and hence the contrast improving sheet is able to improve contrast.

Preferably, the contrast improving sheet in the first aspect of the present invention meets a condition expressed by an expression: $n_3/n_2 = \cos 3\theta_2/\cos \theta_2$, where $\theta_2$ is the inclination angle of the inclined surfaces of the light path correcting layer of the second optical functional element (angle between each of the inclined surfaces and a normal to the sheet surface of the second optical functional element), $n_2$ is the refractive index of a material forming a part of the light path correcting layer on the side of the first optical functional element with respect to the inclined surfaces, and $n_3$ is the refractive index of a material forming a part of the light path correcting layer on the opposite side of the first optical functional element with respect to the inclined surfaces. Thus, the image light rays substantially perpendicularly incident on the entrance surface and passed through the flat facets without being reflected by the total-reflection facets of the protrusions of the first optical functional element can be more surely emitted perpendicularly to the exit surface (in a direction parallel to the incident light rays). Thus, the contrast improving sheet is able to achieve high directivity.

Preferably, the contrast improving sheet in the first aspect of the present invention meets a condition expressed by an expression: $n_2 \cdot \sin 2\theta_2 = n_1 \cdot \sin 2\theta_1$, where $\theta_1$ is the inclination angle of the total-reflection facets of the protrusions of the first optical functional element (angle between each of the total-reflection facets and a normal to the sheet surface of the first optical functional element), $n_1$ is the refractive index of a material forming the protrusions of the first optical functional element, $\theta_2$ is the inclination angle of the inclined surfaces of the light path correcting layer of the second optical functional element (angle between each of the inclined surfaces and a normal to the sheet surface of the second optical functional element), and $n_2$ is the refractive index of a material forming a part of the light path correcting layer on the side of the first optical functional element with respect to the inclined surfaces. Thus, image light rays substantially perpendicularly incident on the entrance surface, totally reflected by the total-reflection facets of the protrusions of the first optical functional element and passed through the flat facets can be refracted at the inclined surfaces of the light path correcting layer of the second optical functional element and can be emitted more surely perpendicularly to the exit surface (in a direction parallel to the incident light). Thus, the contrast improving sheet is able to achieve high directivity.

In the contrast improving sheet in the first aspect of the present invention, it is preferable that the protrusions forming the second optical functional element are arranged in a direction and parallel to the protrusions of the first optical functional element when the protrusions of the first optical functional element are arranged in a direction. Also, it is preferable that the protrusions forming the second optical functional element are distributed in a plane parallel to the protrusions of the first optical functional element when the protrusions of the first optical functional element are distributed in a plane.

A rear projection screen in a second aspect of the present invention for displaying images by transmitting image light rays projected thereon and emitting the image light rays toward the viewing side includes: a Fresnel lens sheet that deflects the image light rays incident on the entrance surface thereof toward the viewing side in a direction substantially perpendicular to the exit surface thereof; and the contrast improving sheet in the first aspect of the present invention, the contrast improving sheet being disposed on the viewing side of the Fresnel lens sheet.

Since the rear projection screen in the second aspect of the present invention includes, in combination, the Fresnel lens sheet that deflects the image light rays incident on the entrance surface toward the viewing side in a direction substantially perpendicular to the exit surface and the contrast improving sheet in the first aspect of the present invention, it is possible to provide a rear projection screen that can increase contrast and has high directivity.

A rear projection screen in a third aspect of the present invention for displaying images by transmitting image light rays projected thereon and emitting the image light rays toward the viewing side includes: a Fresnel lens sheet that deflects the image light rays incident on the entrance surface thereof toward the viewing side in a direction substantially perpendicular to the exit surface thereof; a lenticular lens sheet disposed on the viewing side of the Fresnel lens sheet to diffuse the image light rays; and the contrast improving sheet in the first aspect of the present invention, the contrast improving sheet being disposed on the viewing side of the lenticular lens sheet.

The rear projection screen in the third aspect of the present invention includes the lenticular lens sheet in addition of the components of the rear projection screen in the second aspect of the present invention. Thus, the rear projection screen in the third aspect of the present invention makes images visible from directions in a wide viewing angle.

Preferably, the lenticular lens sheet of the rear projection screen in the third aspect of the present invention has a front surface, on the viewing side, coated with a light absorbing layer, and the contrast improving sheet is bonded adhesively at least to the light absorbing layer of the lenticular lens sheet. Thus, the rear projection screen has high rigidity even when the component lenses of the lenticular lens sheet are arranged at short pitches.

A rear projection screen in a fourth aspect of the present invention for displaying images by transmitting image light rays projected thereon and emitting the image light rays toward the viewing side includes: a Fresnel lens sheet that deflects the image light rays obliquely incident on the entrance surface thereof toward the viewing side in a direction substantially perpendicular to the exit surface thereof, the Fresnel lens sheet including a total-reflection Fresnel lens formed on an entrance surface thereof, and the contrast improving sheet in the first aspect of the present invention, the contrast improving sheet being disposed on the exit surface thereof; and a lenticular lens sheet disposed on the viewing side of the Fresnel lens sheet to diffuse the image light rays.

Since the rear projection screen in the fourth aspect of the present invention includes the Fresnel lens sheet provided with the total-reflection Fresnel lens on the entrance surface thereof, it is possible to reduce stray light rays satisfactorily and prevent formation of double images due to mirror reflection effectively.

EMBODIMENTS CARRYING OUT THE INVENTION

Preferred embodiment of the present invention will be described with reference to the accompanying drawings.

Contrast Improving Sheet

Figure 1:
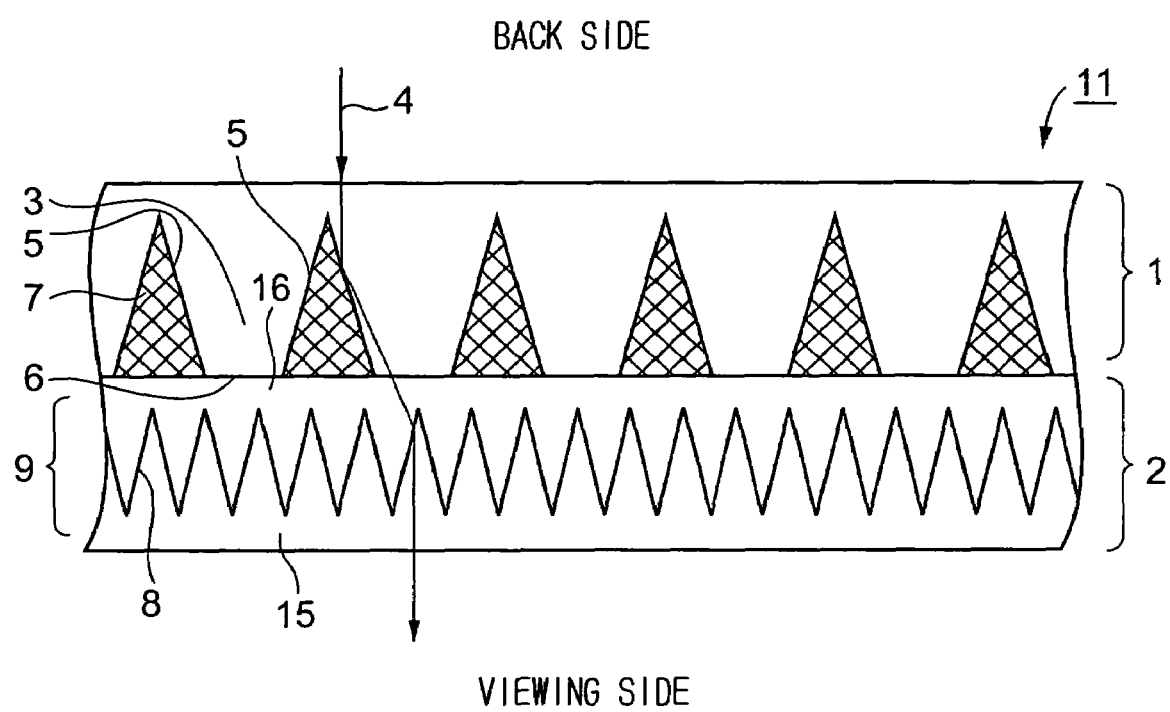
FIG. 1 is a fragmentary sectional view of a contrast improving sheet in a first embodiment of the present invention.

Referring to FIG. 1, a contrast improving sheet 11 in a first embodiment of the present invention is intended to be incorporated into a display, such as a rear projection display, a liquid crystal display or a plasma display. The contrast improving sheet 11 includes a first optical functional element 1 and a second optical functional element 2 attached to the exit surface of the first optical functional element 1.

Figure 2:
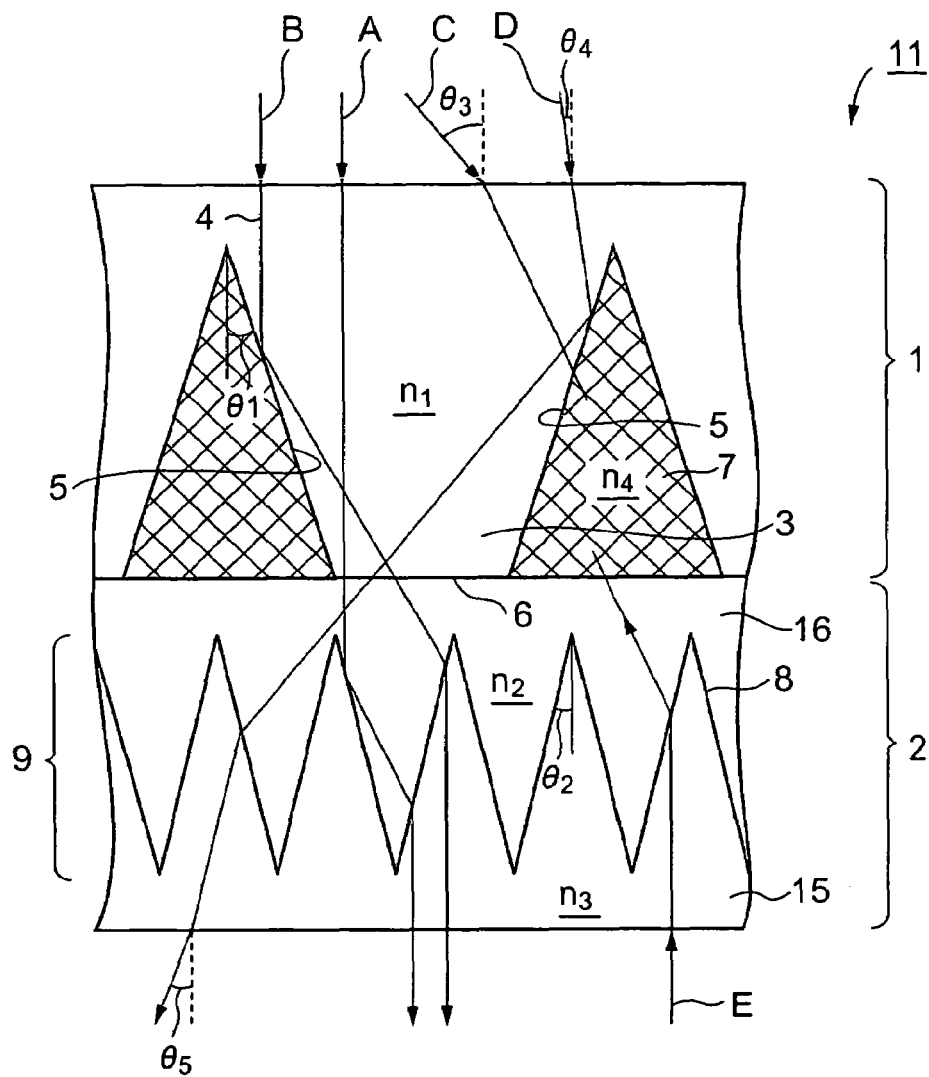
FIG. 2 is a ray tracing diagram showing paths followed by light rays in the contrast improving sheet shown in FIG. 1.

Referring to FIGS. 1 and 2, the first optical functional element 1 is provided with a plurality of protrusions 3 having a trapezoidal cross section and arranged in a direction or distributed in a plane. Each of the protrusions 3 has a pair of opposite total-reflection facets 5 for totally reflecting image light rays 4 substantially perpendicularly incident on the entrance surface of the first optical functional element 1, and a flat facet 6 connecting the front edges, on the exit surface of the first optical functional element 1 contiguous with the second optical functional element 2, of the pair of total-reflection facets 5. V-grooves between the adjacent protrusions 3 are filled up with V-shaped light absorbing layers 7 of a light absorbing material. The total-reflection facets 5 of each protrusion 3 are inclined surfaces represented by inclined lines of a trapezoidal cross section and are boundaries between the protrusion 3 and the adjacent light absorbing layers 7.

Figure 3:
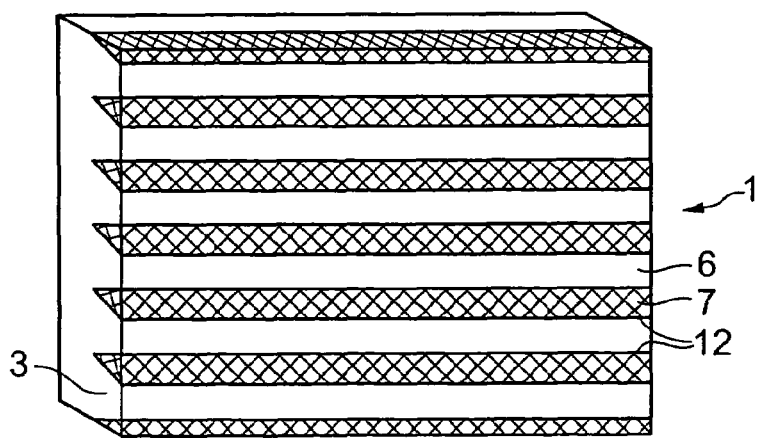
FIG. 3 is a view of assistance in explaining an arrangement of protrusions formed in a first optical functional element included in the contrast improving sheet in the first embodiment.
Figure 4:
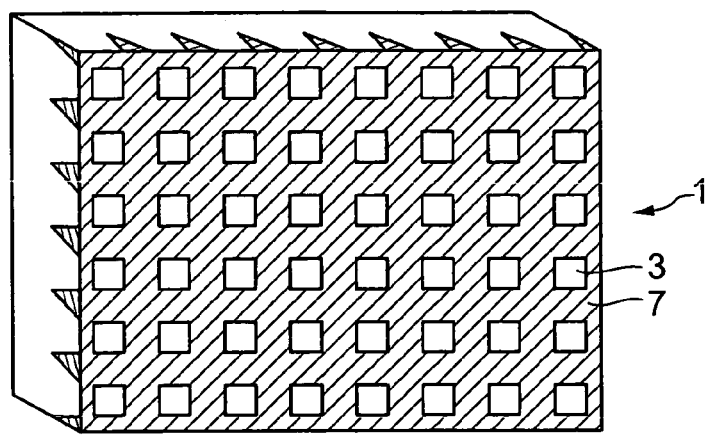
FIG. 4 is a view of assistance in explaining another arrangement of protrusions formed in a first optical functional element included in the contrast improving sheet in the first embodiment.

The protrusions 3 of the first optical functional element 1 may be linear protrusions extended with their ridges 12 extended in a direction and arranged in a vertical direction as shown in FIG. 3 or may be square-prismoidal protrusions arranged in columns and rows as shown in FIG. 4.

As shown in FIGS. 1 and 2, the second optical functional element 2 is placed in contact with the exit surface of the first optical functional element 1 including the flat facets 6 of the protrusions 3 and the surfaces of the light absorbing layers 7. The second optical functional element 2 is provided with a light path correcting layer 9. The light path correcting layer 9 corrects light paths followed by image light rays 4 totally reflected by the total-reflection facets 5 of the protrusions 3 of the first optical functional element 1 such that the image light rays 4 are emitted toward the viewing side substantially perpendicularly to the exit surface of the contrast improving sheet 11. The light path correcting layer 9 is formed by combining protrusions 15 and 16 formed of two types of transparent materials respectively having different refractive indices, respectively. The protrusions 15 and 16 having a triangular cross section demarcated by a boundary plane formed by arranging inclined planes 8 in a triangular shape in a sectional view. Inclined planes 8 inclined in opposite directions, respectively, are arranged alternately. The light path correcting layer 9 refracts the image light rays totally reflected by the total-reflection facets of the protrusions 3 of the first optical functional element 1 such that the image light rays 4 are emitted in a direction substantially perpendicular to the exit surface of the contrast improving sheet 11.

Figure 5:
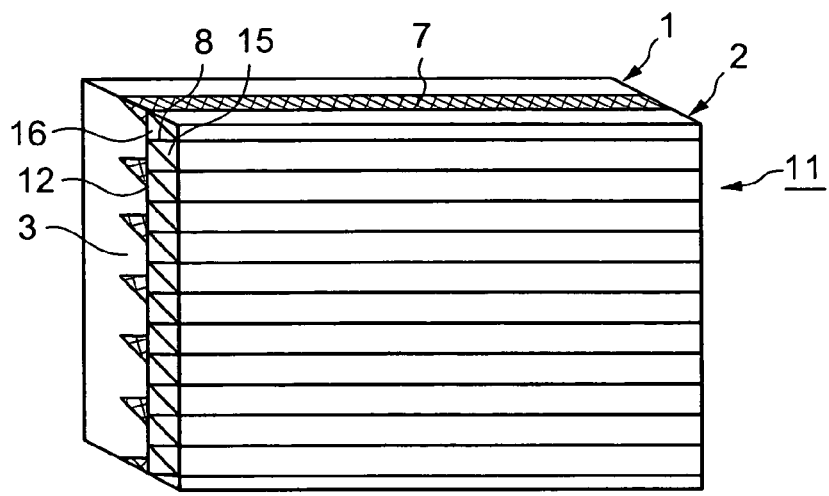
FIG. 5 is a view of a laminated structure formed by combining a first optical functional element and a second optical functional element included in the contrast improving sheet in the first embodiment.
Figure 6:
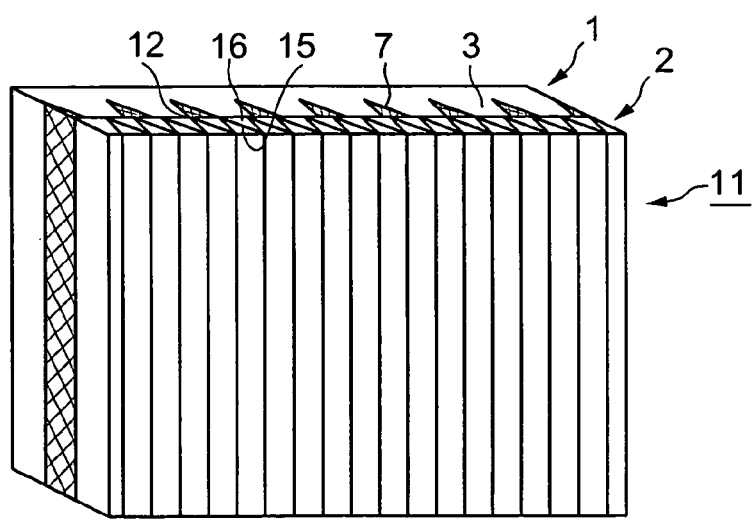
FIG. 6 is a view of another laminated structure formed by combining a first optical functional element and a second optical functional element included in the contrast improving sheet in the first embodiment.
Figure 7:
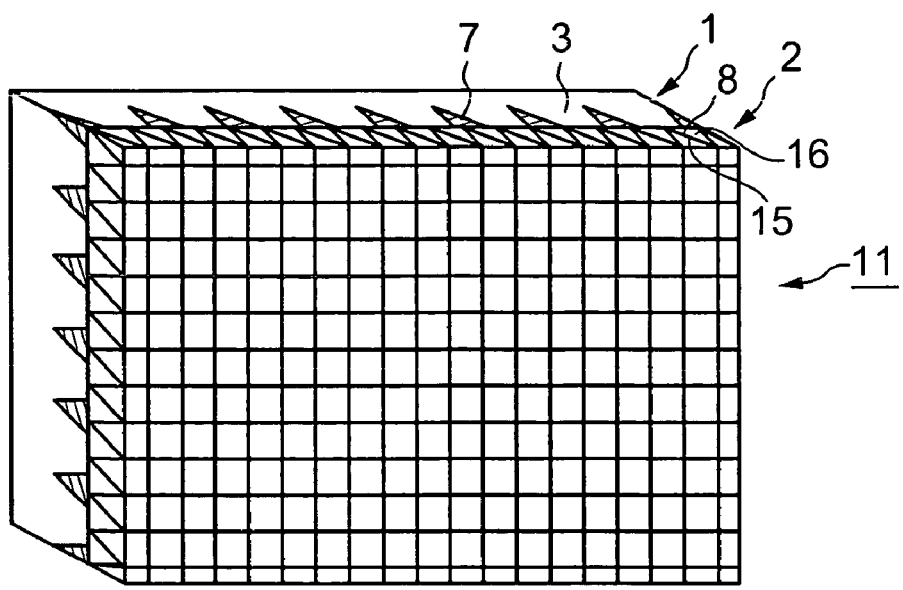
FIG. 7 is a view of a further laminated structure formed by combining a first optical functional element and a second optical functional element included in the contrast improving sheet in the first embodiment.

The inclined planes 8 in the light path correcting layer 9 of the second optical functional element 2 is formed so as to conform to the shape of the protrusions of the first optical functional element 1. More concretely, the ribs 15 and 16 are extended horizontally and the inclined boundary planes 8 demarcating the ribs 15 and 16 extend horizontally and parallel to the ridges 12 of the protrusions 3 as shown in FIG. 5 when the protrusions 3 are linear protrusion extended with their ridges 12 extended horizontally. The ribs 15 and 16 are extended vertically and the inclined boundary planes 8 demarcating the ribs 15 and 16 extend vertically and parallel to the ridges 12 of the protrusions 3 as shown in FIG. 6 when the protrusions 3 are linear protrusion extended with their ridges 12 extended vertically. When the square-prismoidal protrusions 3 are arranged in columns and rows, the protrusions 15 and 16 are formed in a square-prismoidal shape and the inclined planes 8 between the protrusions 15 and 16 are arranged substantially parallel to the total-reflection facets 5 of the protrusions 3 as shown in FIG. 7.

The pitches $P_1$ of the protrusions 3 of the first optical functional element 1 and pitches $P_2$ of the inclined planes 8 of the light path correcting layer 9 of the second optical functional element 2 meet a condition expressed by an inequality: $P_1/P_2 > 3.5$. Preferably, the pitches $P_1$ and $P_2$ are determined selectively so as to meet a condition expressed by an inequality: $P_1/P_2 > 3.5$ and requiring that $P_1/P_2$ is not an integer. Those pitches are adjusted so as to meet the foregoing condition to prevent the formation of conspicuous moiré resulting from interference between those periodic structures.

Light paths in the contrast improving sheet 11 in the first embodiment will be described with reference to FIG. 2.

Indicated at A in FIG. 2 is an image light ray perpendicularly incident on the entrance surface. The contrast improving sheet 11 in the first embodiment is formed so as to meet a condition expressed by Expression (1):

$$n_3/n_2 = \cos 3\theta_2 / \cos \theta_2, \tag{1}$$

where $\theta_2$ is the inclination angle of the inclined planes 8 of the light path correcting layer 9 of the second optical functional element 2 (angle between each of the inclined plane 8 and a normal to the sheet surface of the second optical functional element 2), $n_2$ is the refractive index of a material forming a part of the light path correcting layer 9 on the side of the first optical functional element 1 with respect to the inclined planes 8 (protrusions 16), and $n_3$ is the refractive index of a material forming a part of the light path correcting layer 9 on the opposite side of the front optical functional element 1 with respect to the inclined planes 8 (protrusions 15). As obvious from Expression (1), $\theta_2 < 30°$ and $n_3 < n_2$ in the second optical functional element 2.

Thus, the image light ray A perpendicularly incident on the entrance surface passes the flat facet 6 without being reflected by the total-reflection facet 5 of the protrusion 3; then it is totally reflected by the inclined plane 8 of the light path correcting layer 9; then it is refracted at the inclined plane 8 opposed to the former inclined plane; and then it is emitted from the second optical functional element 2 perpendicularly to the exit surface of the second optical functional element 2, i.e., in a direction parallel to the incident image light ray.

Indicated at B is an image light ray perpendicularly incident on the entrance surface similarly to the image light ray A. The contrast improving sheet in the first embodiment meets a condition expressed by an expression (2):

$$n_2 \cdot \sin 2\theta_2 = n_1 \cdot \sin 2\theta_1, \tag{2}$$

where $\theta_1$ is the inclination angle of the total-reflection facets 5 of the protrusions 3 of the first optical functional element 1 (angle between each of the total-reflection facets 5 and a normal to the sheet surface of the first optical functional element 1), $n_1$ is the refractive index of a material forming the protrusions 3 of the first optical functional element 1, $\theta_2$ is the inclination angle of the inclined planes 8 of the light path correcting layer 9 of the second optical functional element 2 (angle between each of the inclined plane 8 and a normal to the sheet surface of the second optical functional element 2), and $n_2$ is the refractive index of a material forming a part of the light path correcting layer 9 on the side of the first optical functional element 1 with respect to the inclined planes 8 (protrusions 16). Thus, the image light ray B perpendicularly incident on the entrance surface is totally reflected by the total-reflection facet 5 of the protrusion 3 of the first optical functional element 1; then it passes through the flat facets 6; then it is refracted at the inclined plane 8 of the light path correcting layer 9 of the second optical functional element 2; and then it is emitted perpendicularly to the exit surface (in a direction parallel to the incident light ray). The image light rays A and B outgoing from the second optical functional element 2 are parallel to each other.

Expression (2) may be made insignificant by determining $\theta_1$, $\theta_2$, $n_1$ and $n_2$ such that $\theta_1=\theta_2$ and $n_1=n_2$ and the ratio $n_3/n_2$ may be selectively determined so that only the condition expressed by Expression (1) may be satisfied. The image light rays A and B may be made unparallel to each other to make the contrast improving sheet 11 exercise a weak diffusion effect by determining the refractive indices $n_1$, $n_2$ and $n_3$ and the inclination $\theta_2$ of the inclined planes 8 of the light path correcting layer 9 such that the condition expressed by Expression (1) and/or the condition expressed by Expression (2) is changed slightly.

The refractive index $n_4$ of the material (transparent resin) forming the light absorbing layers 7 is smaller than the refractive index $n_1$ of the material forming the protrusions 3, and the inclination angle $\theta_1$ of the total-reflection facets 5 of the protrusions, the refractive index $n_1$ of the material forming the protrusions 3, and the refractive index $n_4$ of the material forming the light absorbing layers 7 meet Expression (3):

$$\theta_1=\cos^{-1}(n_4/n_1)-\sin^{-1}(1/2n_1). \quad (3)$$

The image light rays A and B perpendicularly incident on the entrance surface are totally reflected by the total-reflection facets 5 corresponding to the boundary planes between the protrusions 3 of the first optical functional element 1 and the light absorbing layers 7 contiguous with the protrusions 3.

A light ray C obliquely incident on the entrance surface at an incidence angle of about 30° are not totally reflected by the total-reflection facets 5 corresponding to the boundary planes between the protrusions 3 of the first optical functional element 1 and the light absorbing layers 7 contiguous with the protrusions 3, penetrates into and is absorbed by the light absorbing layer 7. The light ray C is a stray light ray that otherwise leaves the exit surface from a position different from that from which the image light ray that follows a regular light path leaves the exit surface. The light ray C generally causes a double image.

Preferably, the material (transparent resin) having a small refractive index and forming the light absorbing layers 7 contain dispersed, light-absorbing particles or colored with a light-absorptive dye to improve contrast.

A light ray D is obliquely incident on the entrance surface at an incidence angle $\theta_4$ smaller than that at which the light ray C is incident on the entrance surface. The light ray D, similarly to the image light ray B; then it is totally reflected by the total-reflection facet 5 of the protrusion 3 of the first optical functional element 1; then it passes through the flat facets 6; then it is refracted at the inclined plane 8 of the light path correcting layer 9; and then it is emitted through the second optical functional element 2 at an emergence angle $\theta_5$ twice the incidence angle $\theta_4$. Therefore, when diffused light rays fall on the contrast improving sheet 11 at incidence angles $\theta_4$ in the range of about 5° to about 10°, the light rays are emitted from the contrast improving sheet 11 at emergence angles $\theta_5$ about twice the incidence angle $\theta_4$ and directivity can be slightly reduced and the emergence angle can be slightly increased.

A light ray E is an external light ray perpendicularly incident on the exit surface. The light ray E is refracted at the inclined boundary plane 8 of the light path correcting layer 9 of the second optical functional element 2. It is not totally reflected at the boundary between the first optical functional element 1 and the second optical functional element 2, and penetrates into and is absorbed by the light absorbing layer 7. Light paths followed by external light rays, not shown, incident on the exit surface at incidence angles, for example, not smaller than 50° are bent in the direction of thickness of the sheet by the inclined boundary planes 8 of the light path correcting layer 9 of the second optical functional element 2. Consequently, those external light rays are not totally reflected, and penetrate into and is absorbed by the light absorbing layers 7.

Thus, the contrast improving sheet 11 in the first embodiment is formed by combining the first optical functional element 1 and the second optical functional element 2 that meet the conditions expressed by Expressions (1) to (3). Therefore, the light rays A and B (image light rays) substantially perpendicularly incident on the entrance surface of the first optical functional element 1 can be emitted substantially perpendicularly to the exit surface regardless of the position of incidence on the entrance surface, and the light ray C (stray light ray) obliquely incident on the entrance surface of the first optical functional element 1 and the light ray E (external light ray) incident on the exit surface of the second optical functional element 2 can be absorbed by the light absorbing layers 7 of the first optical functional element 1. Consequently, contrast is improved and the image light rays incident on the entrance surface can be transmitted toward the viewing side without loss in high directivity.

The contrast improving sheet 11 in the first embodiment can be fabricated by individually forming the first optical functional element 1 to be disposed on the back side and the second optical functional element 2 to be disposed on the viewing side, and bonding together the first optical functional element 1 and the second optical functional element 2. Since the pitches $P_1$ of the protrusions 3 of the first optical functional element 1 and the pitches $P_2$ of the inclined boundary planes 8 of the light path correcting layer 9 of the second optical functional element 2 are selectively determined so as to meet a condition expressed by an inequality: $P_1/P_2>3.5$, preferably, the pitches $P_1$ and $P_2$ are determined selectively so as to meet a condition expressed by an inequality: $P_1/P_2>3.5$ and requiring that $P_1/P_2$ is not an integer, work for the positional adjustment of the first optical functional element 1 and the second optical functional element 2 relative to each other is not necessary and hence the contrast improving sheet 11 in the first embodiment can be easily fabricated.

In a process of forming the first optical functional element 1, the plurality of protrusions 3 are formed by a known method using a mold, such as a hot pressing method, a thermal polymerization method or a radiation curing method, and then the V-grooves between the protrusions 3 are filled up with the light absorbing material by a wiping method or the like to form the light absorbing layers 7.

In a process of forming the second optical functional element 2, the protrusions on the side of the exit surface, namely, the protrusions 15 (or the protrusions on the side of the entrance surface, namely, the protrusions 16) are formed by the same method as that of forming the protrusions 3 of the first optical functional element 1, and then the V-grooves between the adjacent protrusions on the side of the exit surface, namely, the protrusions 15 (or the protrusions on the side of the entrance surface, namely, the protrusions 16) are filled up with a radiation-curable resin or the like. The radiation-curable resin filling up the V-grooves is cured to complete the other protrusions, namely, the protrusions 16 (or the protrusions 15). In the method, the second optical functional element 2 may be fabricated by forming the protrusions on the side of the exit surface, namely, the protrusions 15, by molding, then filling up the V-grooves between the adjacent protrusions on the side of the exit surface, namely the protrusions 15, with the resin for forming the protrusions on the side of the entrance surface, namely, the protrusions 16, then attaching the first optical functional element 1 to the resin filling up the V-grooves, and curing the resin filling up the V-groove to complete the protrusions on the side of the entrance surface, namely, the protrusions 16, of the second optical functional element 2. Thus, the first optical functional element 1 and the second optical functional element 2 can be bonded together in the process of forming the second optical functional element 2. Another method may form the protrusions 3 of the first optical functional element 1 and the light path correcting layer 9 of the second optical functional element 2 on substantially transparent films or sheets, and may bond together the films or the sheets with an adhesive layer.

It is preferable from the viewpoint of manufacture that at least the material for forming the first optical functional element 1 and at least either of two types of materials for forming the protrusions 15 and 16 of the light path correcting layer of the second optical functional element 2 are radiation-curable resins. Possible radiation-curable resins are those generally used in this field including, for example, UV-curable resins and electron beam-curable resins, such as acrylic resins, epoxy resins and urethane resins. Possible films as the transparent films or sheets on which the protrusions 3 of the first optical functional element 1 and the light path correcting layer 9 of the second optical functional element 2 are formed are generally used films including polyester films and polycarbonate films.

The light absorbing layers 7 of the first optical functional element 1 are formed of a material prepared by dispersing light absorbing particles in a transparent resin having a small refractive index or coloring such a resin with a light absorbing dye. Although it is preferable that the light absorbing layers 7 have an achromatic color, such as black or grey, the light absorbing layers 7 may be formed of a material capable of absorbing specific wavelengths dependent on the characteristics of image light. Suitable light absorbing particles are those of carbon black, graphite, metal salts, such as black iron oxide, colored organic materials and colored glass. Suitable dyes are organic xanthene dyes, such as acid red, and organic neodymium dies, such as neodymium carboxylate.

The material for forming the protrusions 3 of the first optical functional element 1 and the two types of materials forming the protrusions 15 and 16 of the light path correcting layer 9 of the second optical functional element 2, and at least either of the transparent films or sheets on which the protrusions 3 of the first optical functional element 1 and the light path correcting layer 9 of the second optical functional element 2 are formed may contain a coloring matter for the further improvement of contrast.

The contrast improving sheet 11 in the first embodiment may be further provided with a UV absorbing layer (or a film or a sheet) laminated to the exit surface of the second optical functional element 2. At least one of a hard coating layer, an antireflection layer, a glare-proof layer and an antistatic layer may be attached to the exit surface of the contrast improving sheet 11 in the first embodiment.

The contrast improving sheet 11 in the first embodiment can be disposed in front of an image forming surface, facing the viewing side, of a display, such as a rear projection display, an electron-flood-beam flat display (a liquid crystal display, a plasma display or an EL display). When the contrast improving sheet 11 is used in combination with a rear projection display, the contrast improving sheet 11 is particularly effective in improving contrast in images under external light and in improving images by effectively absorbing optical noise, such as light forming ghosts and rainbows due to the action of a Fresnel lens and back mirror combined with the rear projection display.

Rear Projection Screen

A rear projection screen provided with the contrast improving sheet 11 in the first embodiment will be described. The rear projection screen is suitable for use in a rear projection display.

Figure 8:
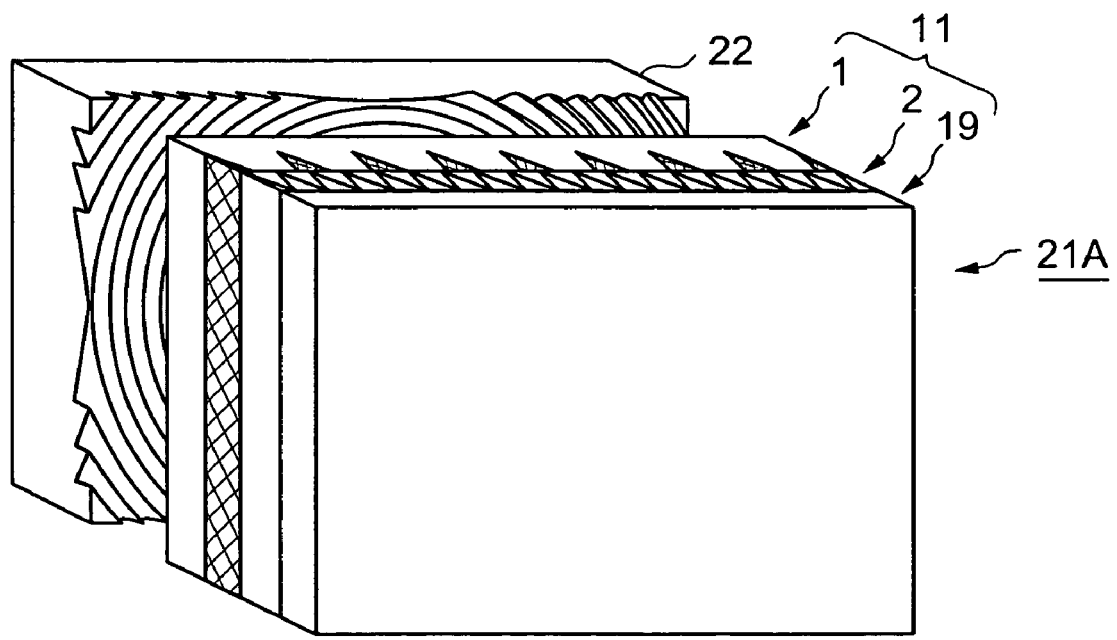
FIG. 8 is a perspective view of a rear projection screen provided with the contrast improving sheet in the first embodiment.

FIG. 8 shows a rear projection screen 21A provided with the contrast improving sheet 11 in the first embodiment by way of example. Referring to FIG. 8, the rear projection screen 21A transmits image light rays projected on its entrance surface and emits the image light rays through its exit surface toward the viewing side to display an image. The rear projection screen 21A includes a Fresnel lens sheet 22 for deflecting the image light rays projected on its back surface in a direction substantially perpendicular to the exit surface, and the contrast improving sheet 11 disposed on the front side of the Fresnel lens sheet 22. The contrast improving sheet 11 includes, in addition to the first optical functional element 1 and the second optical functional element 2, a layer 19, such as a UV absorbing layer.

The rear projection screen 21A shown in FIG. 8 is not provided with any optical element for diffusing image light, such as a lenticular lens sheet. If the image light rays incident on the contrast improving sheet 11 is diffused light rays, the contrast improving sheet 11 is able to substantially double the angle of diffusion (angle $\theta_4$ in FIG. 2). Therefore, the rear projection screen 21A shown in FIG. 8 is able to exercise a diffusing effect of about 10° with respect to vertical directions and about 20° with respect to horizontal directions if the Fresnel lens sheet 22 contains a light diffusing agent such that light rays traveled through the Fresnel lens sheet 22 are diffused in a diffusing angle of about 10°.

Figure 9:
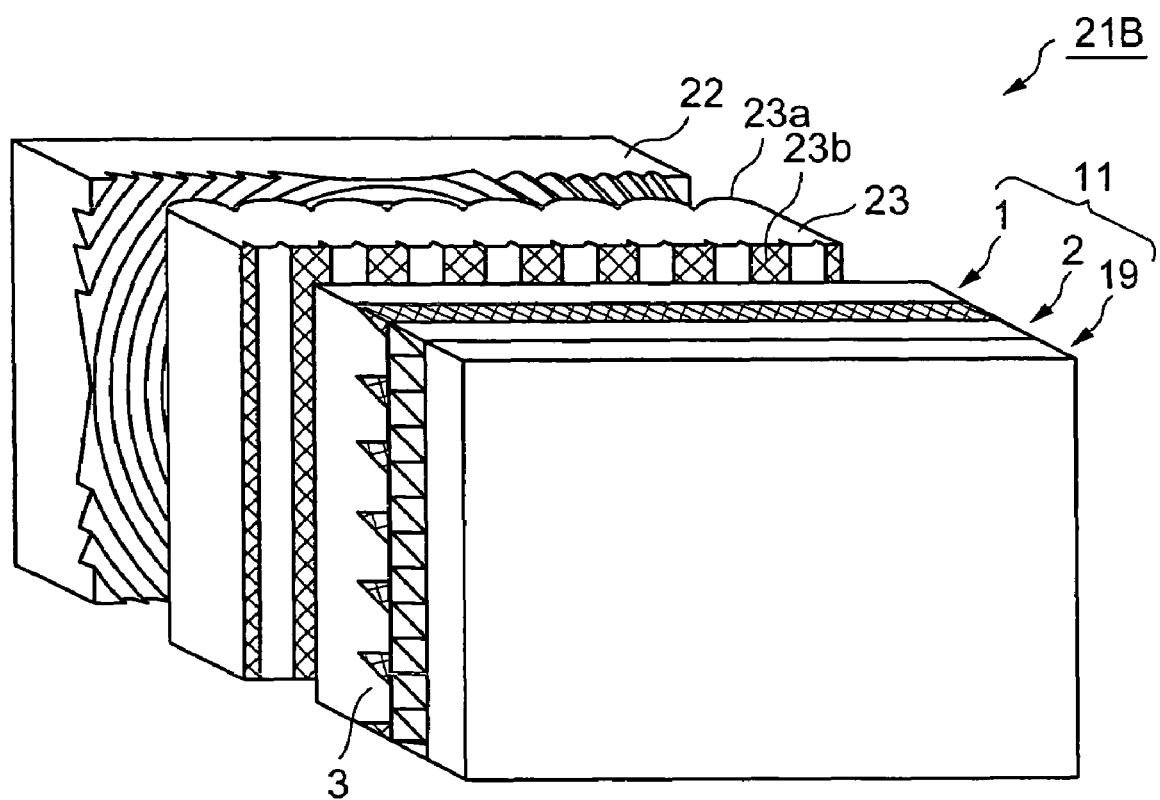
FIG. 9 is a perspective view of another rear projection screen provided with the contrast improving sheet in the first embodiment.

FIG. 9 shows another rear projection screen 21B provided with the contrast improving sheet 11 in the first embodiment. Referring to FIG. 9, the rear projection screen 21B is a three-layer screen including a Fresnel lens sheet 22 for deflecting the image light rays projected on its back surface in a direction substantially perpendicular to the exit surface, a lenticular lens sheet 23 disposed on the front side of the Fresnel lens sheet 22 to diffuse image light rays, and the contrast improving sheet 11 disposed on the front side of the lenticular lens sheet 23. The contrast improving sheet 11 includes, in addition to the first optical functional element 1 and the second optical functional element 2, a layer 19, such as a UV absorbing layer.

Since the contrast improving sheet 11 in the first embodiment is able to diffuse image light rays incident on its entrance surface in about double diffusing angle, the amount of the light absorbing agent contained in the lenticular lens sheet 23 can be reduced and, consequently, the rear projection screen 21B, as compared with the conventional rear projection screen, is capable of displaying clearer images.

The contrast improving sheet 11 and the lenticular lens sheet 23 may be bonded together with an adhesive layer. When the lenticular lens sheet 23 is a fine, thin one, it is preferable to bond the contrast improving sheet 11 to a front light absorbing layers (black stripes) 23b of the lenticular lens sheet 23 to increase the rigidity of the sheet. When the image source of a rear projection display is a single-tube light source, such as a LCD or a DLP, and the exit surface of the lenticular lens sheet 23 included in the rear projection screen 21B is flat, the contrast improving sheet 11 may be bonded to the entire front surface of the lenticular lens sheet 23.

As shown in FIG. 9, the lenticular lens sheet 23 is provided on its back surface with a plurality of vertical lenticular lenses 23a, and the protrusions 3 of the contrast improving sheet 11 are extended perpendicularly to the vertical lenticular lenses 23a.

Figure 10:
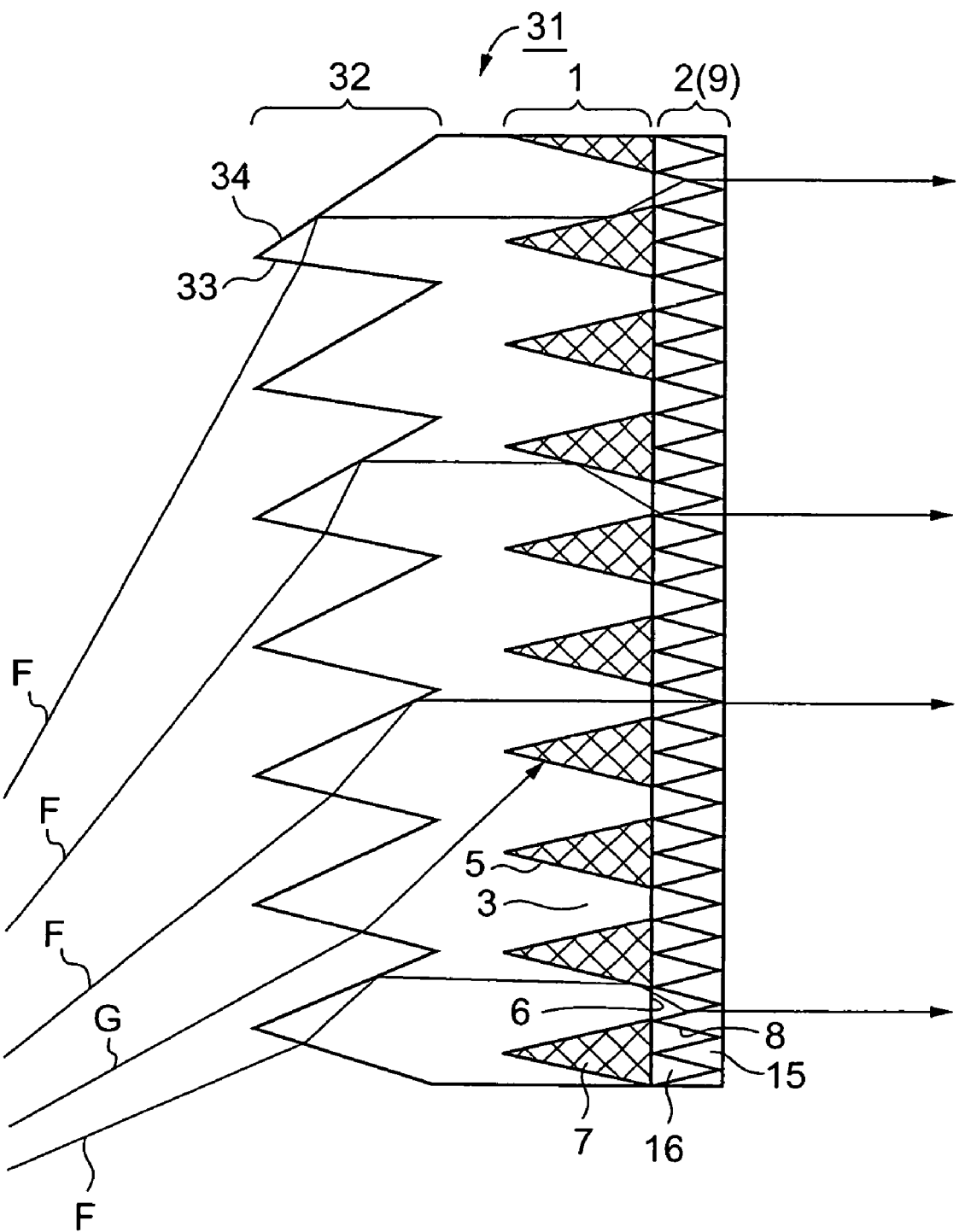
FIG. 10 is a fragmentary sectional view of a contrast improving sheet in a second embodiment of the present invention.

Although the contrast improving sheet 11 and the Fresnel lens sheet 22 are individual members in each of the rear projection screen 21A shown in FIG. 8 and the rear projection screen 21B shown in FIG. 9, it is possible to use a total-reflection Fresnel lens sheet 31 as shown in FIG. 10, which is integrally provided with a functional structure having the function of a contrast improving sheet.

As shown in FIG. 10, the total-reflection Fresnel lens sheet 31 for deflecting image light rays obliquely incident on its entrance surface in a direction substantially perpendicular to its exit surface includes: total-reflection Fresnel lens 32 formed in its entrance surface, and the contrast improving sheet including the first optical functional element 1 and the second optical functional element 2, both elements being formed integrally with the Fresnel lens 32.

Light rays F, namely, image light rays, incident on the entrance facets 33 of the total-reflection Fresnel lens 32 and totally reflected by the total-reflection facets 34 of the total-reflection Fresnel lens 32 fall on the first optical functional element 1 substantially perpendicularly. Consequently, the light rays passed through the first optical functional element 1 and the second optical functional element 2 are emitted from the total-reflection Fresnel lens sheet 31 substantially perpendicularly to the exit surface of the Fresnel lens sheet 31. Light rays G incident on the entrance facets 33 of the total-reflection Fresnel lens 32 formed in the entrance surface, not totally reflected by the total-reflection facets 34 and traveling in stray light rays fall obliquely on the first optical functional element 1 and are absorbed by the light absorbing layers 7. Thus, stray light rays are not emitted toward the viewing side.

Figure 11:
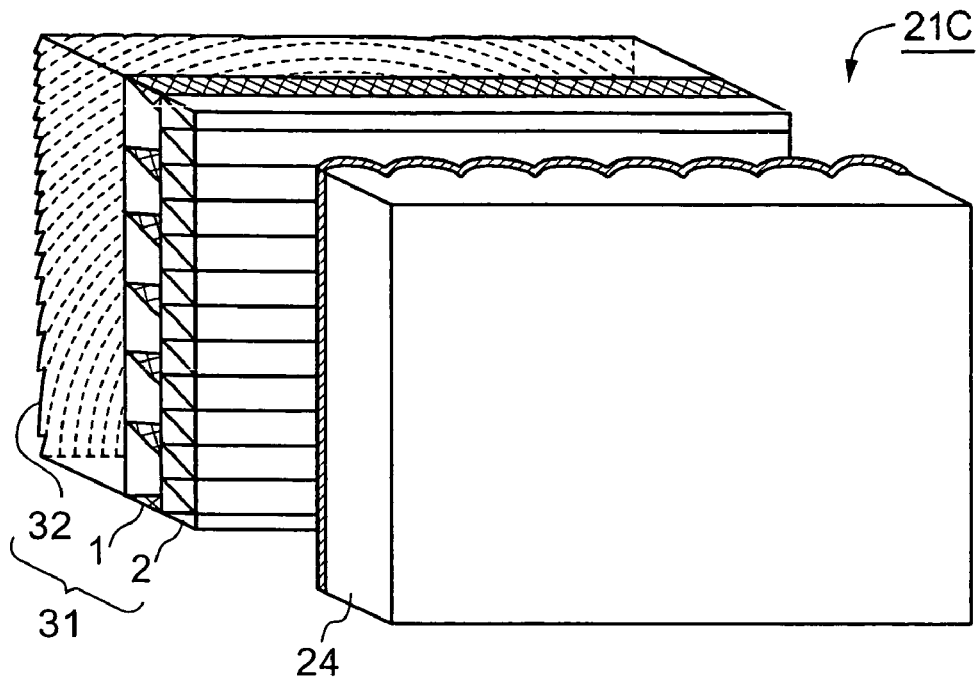
FIG. 11 is a perspective view of a rear projection screen provided with the contrast improving sheet in the second embodiment.
Figure 12:
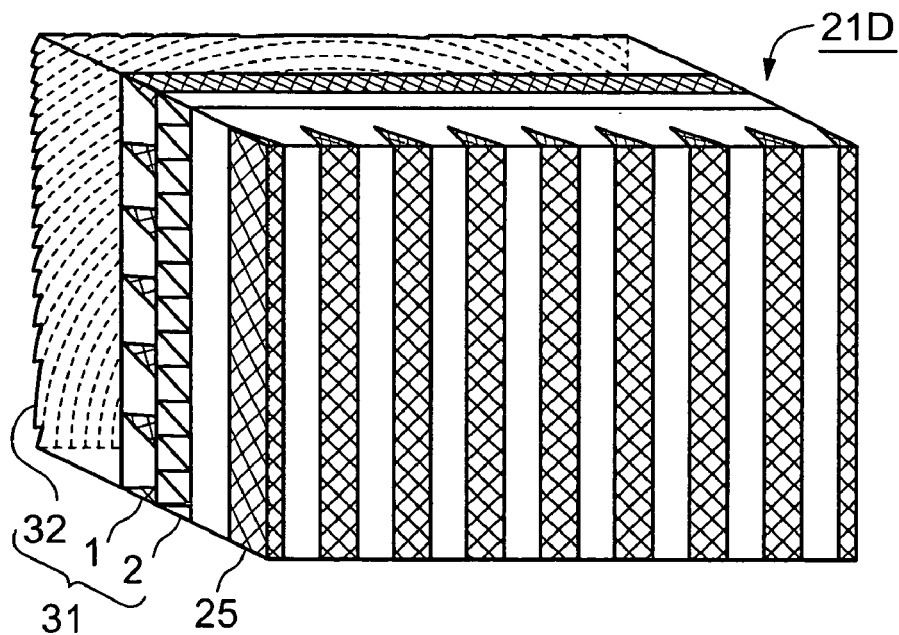
FIG. 12 is a perspective view of another rear projection screen provided with the contrast improving sheet in the second embodiment.

The total-reflection Fresnel lens sheet 31 is included in a rear projection screen 21C as shown in FIG. 11. Referring to FIG. 11, the rear projection screen 21C includes the total-reflection Fresnel lens sheet 31 and a lenticular lens sheet 24 disposed on the front side of the total-reflection Fresnel lens sheet 31. The total-reflection Fresnel lens sheet 31 can be included in a rear projection screen 21D as shown in FIG. 12. As shown in FIG. 12, the rear projection screen 21D includes the total-reflection Fresnel lens sheet 31 and a total-reflection lenticular lens sheet 25 disposed in front of the total-reflection Fresnel lens sheet 31.

EXAMPLES

Examples of the foregoing preferred embodiments will be described.

Example 1

Protrusions of 0.6 mm in height having a trapezoidal sectional shape were formed of a UV-curable resin having a refractive index $n_1$ f 1.55 after curing on one of the major surfaces of a 50 μm thick PET film having a refractive index of 1.6. The protrusions were arranged at pitches $P_1$ of 0.3 mm. Each protrusions had a flat facet of 0.169 mm in width and total-reflection facets inclined at an inclination angle $\theta_1$, of 8°. light absorbing layers were formed by filling up V-grooves between the adjacent protrusions having the trapezoidal sectional shape with a light absorbing material prepared by dispersing black beads having a mean particle size of 6 μm in a acrylic coating material having a refractive index $n_4$ of 1.49 to form a first optical functional element.

Protrusions of 135 μm in height having a triangular sectional shape were formed of a resin produced by modifying an acrylic resin and having a refractive index $n_3$ of 1.48 on one of the major surfaces of a 1.5 mm thick acrylonitrile-styrene copolymer film having a refractive index of 1.53. The protrusions were arranged at pitches $P_2$ of 40 μm ($P_1/P_2$=7.5) so that conspicuous moiré may not be formed by the protrusions. The inclination angle $\theta_2$ of the facets of the protrusions was 8° equal to that of the inclination angle of the facets of the protrusions 3 of the first optical functional element 1. An EB-curable styrene resin was filled in V-grooves between the protrusions and the EB-curable styrene resin was cured to form a second optical functional element 2.

The first and second optical functional elements thus fabricated were bonded together with their protrusions opposed to each other to complete a contrast improving sheet in Example 1.

(Evaluation)

The contrast improving sheet in Example 1 was evaluated.

A commercial rear projection television set (Hitachi) on the market was used for evaluating the contrast improving sheet. The rear projection television set was provided with a three-layer rear projection screen consisting of a Fresnel lens sheet, a lenticular lens sheet and a colored sheet, namely, a lightly colored transparent resin sheet. A test rear projection screen was built by using the contrast improving sheet in Example 1 instead of the colored sheet of the rear projection screen. Television images were displayed on the test rear projection screen and the conventional rear projection screen and were observed for comparison. The first and the second optical functional element of the contrast improving sheet were combined and the contrast improving sheet was incorporated into the test rear projection screen as shown in FIG. 9.

The rear projection screen provided with the contrast improving sheet in Example 1, as compared with the conventional rear projection screen provided with the colored sheet, displayed images in improved contrast and could display clear images even in a light environment. Where as a faint rainbow was observed on the conventional rear projection screen provided with the colored sheet due to the agency of the Fresnel lens sheet, any rainbow could not be observed at all on the rear projection screen provided with the contrast improving sheet in Example 1.

Figure 13:
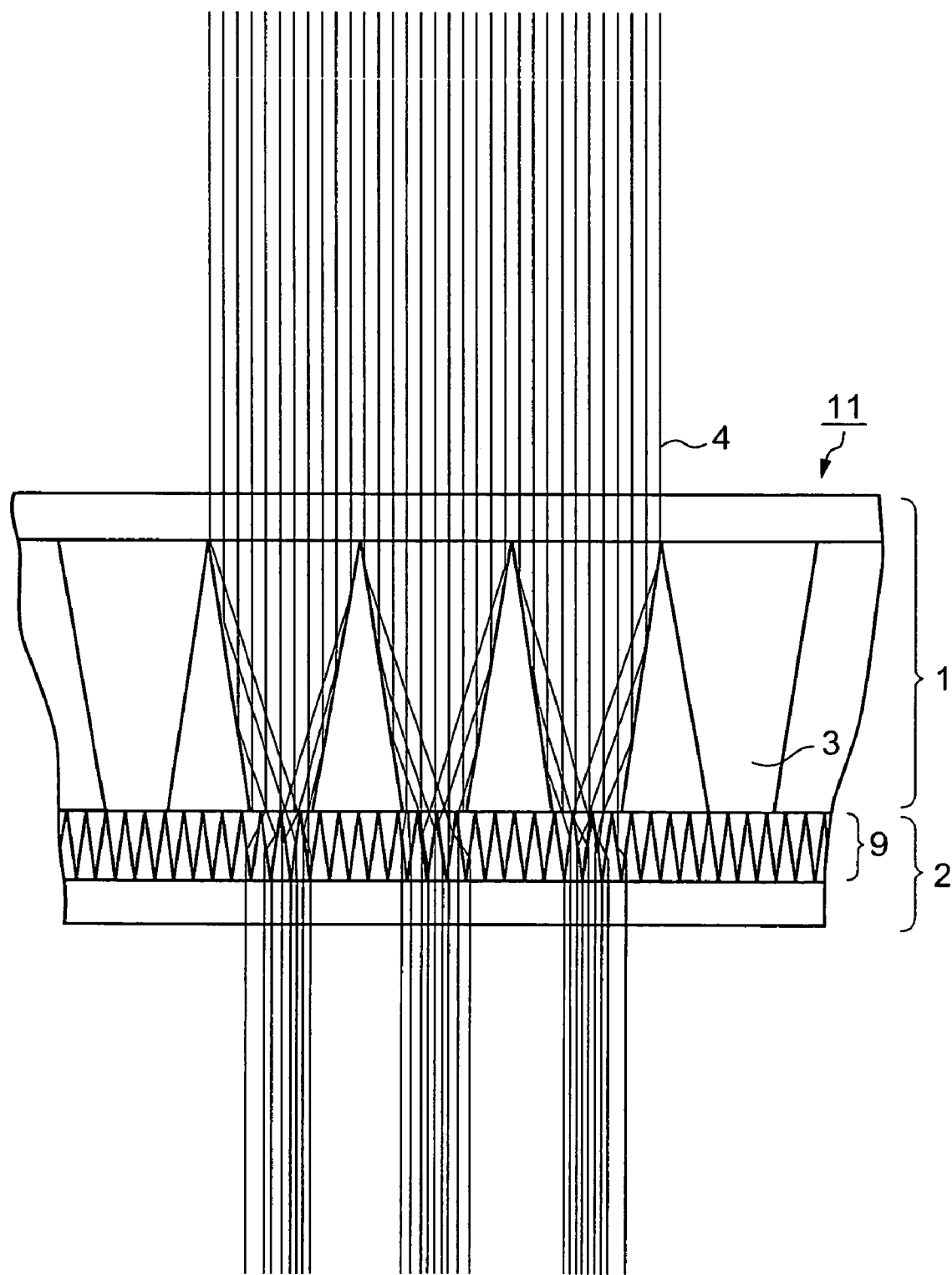
FIG. 13 is a ray tracing diagram showing light paths followed by light rays in a contrast improving sheet in Example 1.
Figure 14:
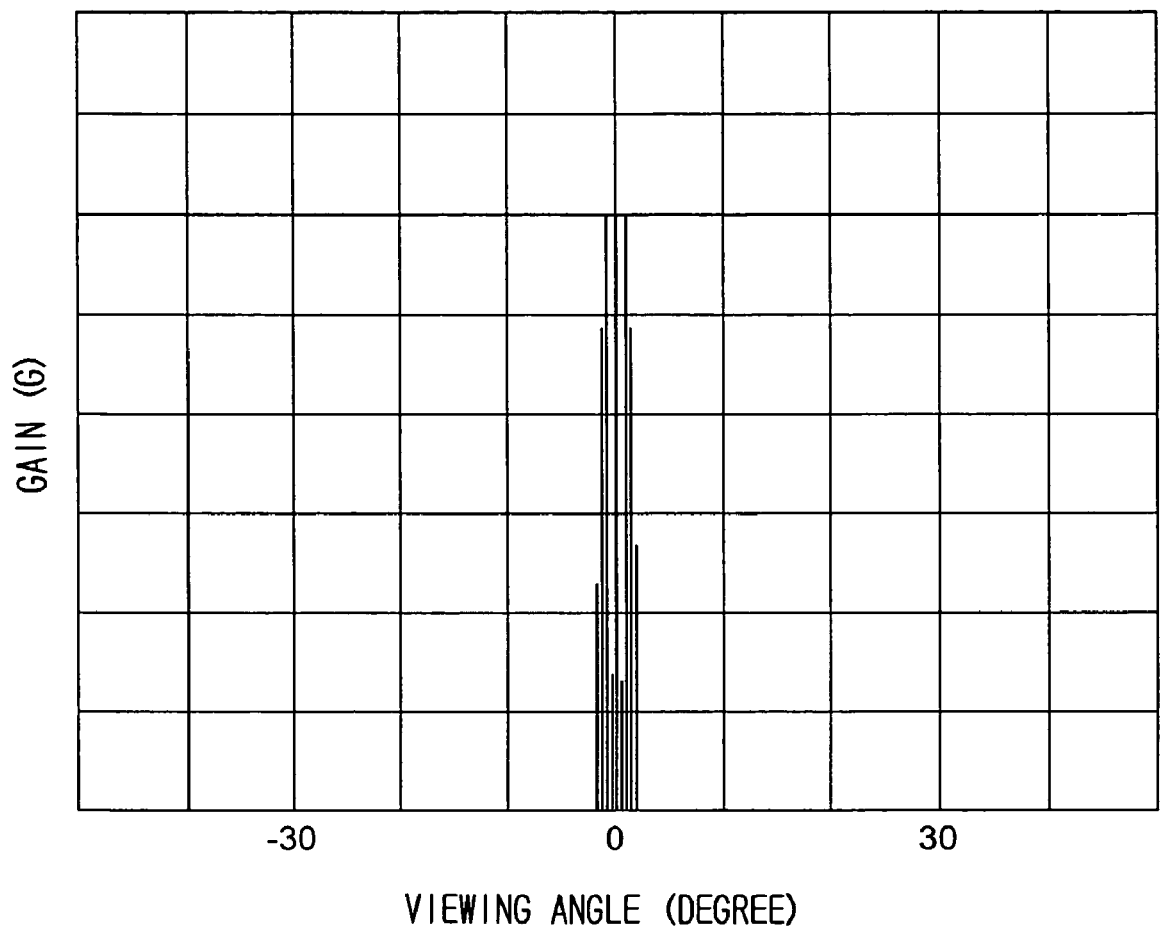
FIG. 14 is a diagram showing the light distribution characteristic of the contrast improving sheet in Example 1.
Figure 15:
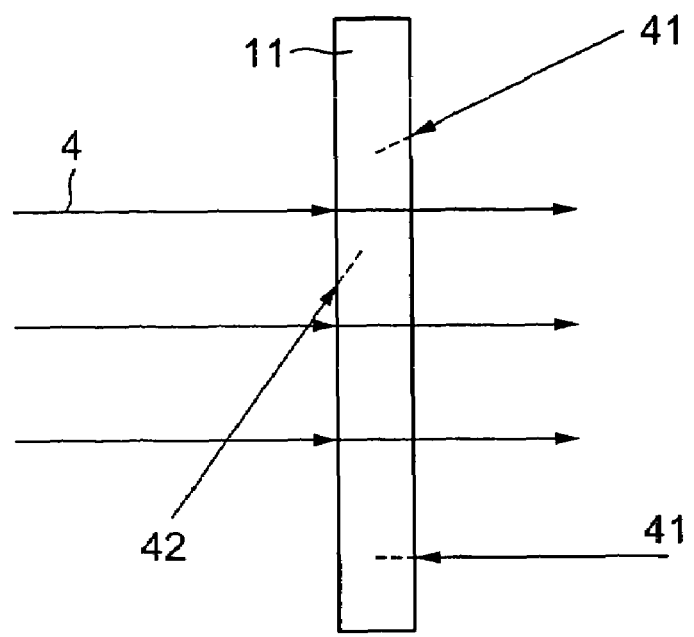
FIG. 15 is a diagrammatic view of assistance in explaining the optical characteristic of a contrast improving sheet according to the present invention.
Figure 16:
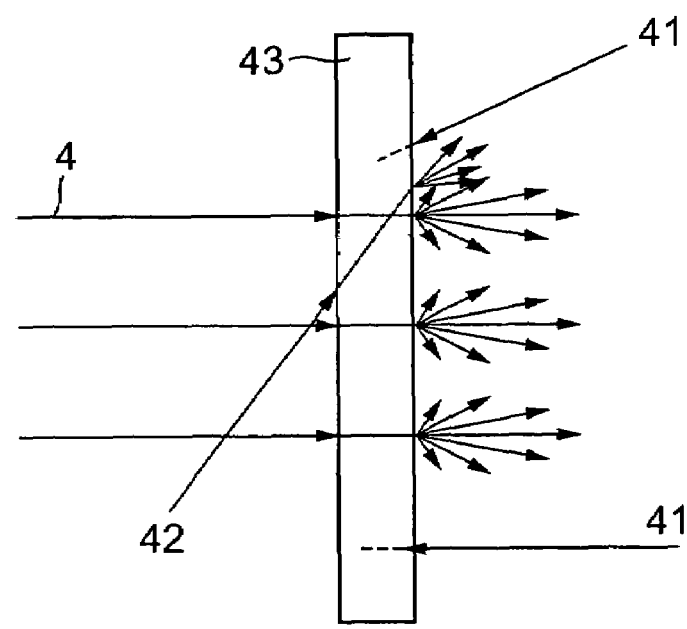
FIG. 16 is a diagrammatic view of assistance in explaining the optical characteristic of a conventional lenticular lens sheet.

FIG. 13 is a ray tracing diagram showing light paths followed by light rays in a contrast improving sheet in Example 1. FIG. 14 is a diagram showing the light distribution characteristic of the contrast improving sheet in Example 1. As obvious from FIGS. 13 and 14, the contrast improving sheet in Example 1 has excellent directivity. Gain G mentioned in FIG. 14 was calculated by using an expression: G=(Luminance)/(Illuminance) expressing the relation between luminance and illuminance.

Example 2

A contrast improving sheet in Example 2 was fabricated by the same method as that of forming the contrast improving sheet in Example 1 and using the same materials as those used for forming the contrast improving sheet in Example 1, except that protrusions of a first optical functional element and a back part, contiguous with the first optical functional element, of a second optical functional element were formed of the same resin having a refractive index of 1.55, and a front part, apart from the first optical functional element, of the second optical functional element was formed of a silicone resin having a refractive index of 1.43.

(Evaluation)

The contrast improving sheet in Example 2 was evaluated.

A rear projection television set having a projection distance of 300 mm, a projection angle of 65° and a screen size of 60 in. was used as a test rear projection television set. The test rear projection television set was provided with a conventional rear projection screen including a total-reflection Fresnel lens sheet and a lenticular lens sheet. A test rear projection screen was provided with a composite total-reflection Fresnel lens sheet built by bonding the contrast improving sheet in Example 2 to the front surface of a total-reflection Fresnel lens sheet of the same optical characteristic as the total-reflection Fresnel lens sheet of the conventional rear projection screen instead of the total-reflection Fresnel lens sheet of the conventional rear-projection screen. Television images displayed on the conventional rear projection screen and the test rear projection screen provided with the contrast improving sheet in Example 2 were observed for comparison. First and second optical functional elements of the contrast improving sheet were laminated and the contrast improving sheet was incorporated into the rear projection screen as shown in FIG. 11.

The test rear projection screen provided with the composite Fresnel lens sheet formed by bonding together the Fresnel lens sheet and the contrast improving sheet in Example 2, as compared with the conventional rear projection screen, displayed images in improved contrast and more clearly in a light environment. Whereas double images due to the agency of the total-reflection Fresnel lens sheet and those due to mirror reflection were observed on the conventional rear projection screen, any double images were not observed at all on the test rear projection screen.

Example 3

A contrast improving sheet in Example 3 was fabricated similarly to the contrast improving sheet in Example 2, except that the contrast improving sheet in Example 3 included a first optical functional element having protrusions of 0.126 mm arranged at pitches $P_1$ of 0.063 mm and a second optical functional element having protrusions of 60 μm arranged at pitches $P_2$ of 18 μm ($P_1/P_2=3.5$).

(Evaluation)

The contrast improving sheet in Example 3 was evaluated.

The contrast improving sheet in Example 3 was combined with a liquid crystal monitor of 15 in. in screen size included in a personal computer (PC). Images displayed on the screen of the liquid crystal monitor were observed through the contrast improving sheet in Example 3. First and second optical functional elements of the contrast improving sheet were laminated and the contrast improving sheet was incorporated into the liquid crystal monitor as shown in FIG. 6.

The liquid crystal monitor reflected nothing in a light environment. Whereas clear images could be recognized in high contrast when the screen of the liquid crystal monitor was viewed from a direction perpendicular to the liquid crystal monitor, any images could not be seen on the screen of the liquid crystal monitor when the screen of the liquid crystal monitor was viewed obliquely from horizontal directions at 25° or greater to a normal to the screen of the liquid crystal monitor. Thus, the satisfactory stealthy peep preventing function of the contrast improving sheet was assured.

The invention claimed is:

1. A contrast improving sheet to be used in combination with a display, said contrast improving sheet comprising an optical element adapted to emit image light rays substantially perpendicularly incident on an entrance surface thereof in a direction substantially perpendicular to an exit surface thereof regardless of incidence position on the entrance surface and to absorb stray light rays obliquely incident on the entrance surface and external light fallen on the exit surface, wherein the optical element comprises:
a first optical functional element provided with a plurality of protrusions arranged in a direction or distributed in a plane, each of the protrusions having a pair of opposite total-reflection facets for totally reflecting image light rays substantially perpendicularly incident on an entrance surface thereof and a flat facet extending between front edges, on a side of an exit surface thereof, of the pair of opposite total-reflection facets, and light absorbing layers formed between the adjacent protrusions; and a second optical functional element attached to a surface, on a viewing side, of the first optical functional element, and provided with a light path correcting layer for correcting light paths followed by the image light rays totally reflected by the total-reflection facets of the protrusions such that the image light rays are emitted through an exit surface thereof substantially perpendicularly to the exit surface.

2. The contrast improving sheet according to claim 1, wherein the light path correcting layer of the second optical functional element has a plurality of inclined surfaces formed in an alternate arrangement and adapted to emit the image light rays totally reflected by the total-reflection facets of the first optical functional element in a direction substantially perpendicular to the exit surface.

3. The contrast improving sheet according to claim 2, characterized in that the inclined surfaces included in the light path correcting layer of the second optical functional element are formed such that substantially parallel are both image light rays substantially perpendicularly incident on an entrance surface thereof, traveled through the flat facets without being reflected by the total-reflection facets of the protrusions of the first optical functional element, reflected by the inclined surfaces and refracted at the inclined surfaces, and image light rays totally reflected by the total-reflection facets of the protrusions of the first optical functional element, traveled through the flat facets and refracted at the inclined surfaces.

4. The contrast improving sheet according to claim 1, characterized in that the light absorbing layers of the first optical functional element are formed of a transparent material having a refractive index smaller than that of a material forming the protrusions of the first optical functional element, the light absorbing layers containing light absorbing particles.

5. The contrast improving sheet according to claim 1, characterized in that the light absorbing layers of the first optical functional element are formed of a colored material having a refractive index smaller than that of the material forming the protrusions of the first optical functional element.

6. The contrast improving sheet according to claim 1, characterized in meeting a condition expressed by an expression: $n_3/n_2 = \cos 3\theta_2/\cos \theta_2$, where $\theta_2$ is an inclination angle of the inclined surfaces of the light path correcting layer of the second optical functional element (angle between each of the inclined surfaces and a normal to a sheet surface of the second optical functional element), $n_2$ is a refractive index of a material forming a part of the light path correcting layer on a side of the first optical functional element with respect to the inclined surfaces, and $n_3$ is a refractive index of a material forming a part of the light path correcting layer on the opposite side of the first optical functional element with respect to the inclined surfaces.

7. The contrast improving sheet according to claim 1, characterized in meeting a condition expressed by an expression: $n_2 \cdot \sin 2\theta_2 = n_1 \cdot \sin 2\theta_1$, where $\theta_1$ is an inclination angle of the total-reflection facets of the protrusions of the first optical functional element (angle between each of the total-reflection facets and a normal to a sheet surface of the first optical functional element), $n_1$ is the refractive index of a material forming the protrusions of the first optical functional element, $\theta_2$ is an inclination angle of the inclined surfaces of the light path correcting layer of the second optical functional element (angle between each of the inclined surfaces and a normal to a sheet surface of the second optical functional element), and $n_2$ is a refractive index of a material forming a part of the light path correcting layer on the side of the first optical functional element with respect to the inclined surfaces.

8. A rear projection screen for displaying images by transmitting image light rays projected thereon and emitting the image light rays toward a viewing side, said rear projection screen comprising:

a Fresnel lens sheet that deflects image light rays incident on an entrance surface thereof toward a viewing side in a direction substantially perpendicular to an exit surface thereof; and a contrast improving sheet as set forth in claim 1, the contrast improving sheet being disposed on the viewing side of the Fresnel lens sheet.

9. A rear projection screen for displaying images by transmitting image light rays projected thereon and emitting the image light rays toward a viewing side, said rear projection screen comprising:

a Fresnel lens sheet that deflects image light rays incident on an entrance surface thereof toward a viewing side in a direction substantially perpendicular to an exit surface thereof;

a lenticular lens sheet disposed on the viewing side of the Fresnel lens sheet to diffuse the image light rays; and a contrast improving sheet as set forth in claim 1, the contrast improving sheet being disposed on a viewing side of the lenticular lens sheet.

10. The rear projection screen according to claim 9, characterized in that the lenticular lens sheet has a front surface, on a viewing side, coated with a light absorbing layer, and the contrast improving sheet is bonded adhesively at least to the light absorbing layer of the lenticular lens sheet.

11. A rear projection screen for displaying images by transmitting image light rays projected thereon and emitting the image light rays toward a viewing side, said rear-projection screen comprising:

a Fresnel lens sheet that deflects image light rays obliquely incident on an entrance surface thereof toward a viewing side in a direction substantially perpendicular to an exit surface thereof, the Fresnel lens sheet including a total-reflection Fresnel lens formed on an entrance surface thereof and a contrast improving sheet as set forth in claim 1, the contrast improving sheet being disposed on an exit surface thereof; and a lenticular lens sheet disposed on the viewing side of the Fresnel lens sheet to diffuse the image light rays.

* * * * *